Nov. 14, 1961   M. J. CORBETT, JR., ET AL   3,008,721
AUTOMATIC PHONOGRAPH

Filed Jan. 16, 1956   5 Sheets-Sheet 1

INVENTORS.
MICHAEL J. CORBETT, JR.
FRED H. OSBORNE.
BY ROBERT S. TUTTLE.
Lockwood, Galt, Woodard & Smith
ATTORNEYS.

Nov. 14, 1961  M. J. CORBETT, JR., ET AL  3,008,721
AUTOMATIC PHONOGRAPH
Filed Jan. 16, 1956  5 Sheets-Sheet 3

FIG. 3

INVENTORS.
MICHAEL J. CORBETT, JR.
FRED H. OSBORNE.
BY ROBERT S. TUTTLE.

Lockwood, Galt, Wooday & Smith
ATTORNEYS.

United States Patent Office 3,008,721
Patented Nov. 14, 1961

3,008,721
AUTOMATIC PHONOGRAPH
Michael J. Corbett, Jr., North Tonawanda, Fred H. Osborne, Snyder, and Robert S. Tuttle, Eggertsville, N.Y., assignors to The Rudolph Wurlitzer Company, Chicago, Ill., a corporation
Filed Jan. 16, 1956, Ser. No. 559,279
9 Claims. (Cl. 274—10)

This invention relates to an automatic selective type of record changing mechanism primarily adapted for a coin operated phonograph, more particularly the mechanism as illustrated and described in detail in application for Letters Patent, Serial No. 388,242, filed October 26, 1953, entitled "Automatic Phonograph."

In the above application, there was provided a record changer having a horizontally rotatable magazine provided with a peripheral series of radial pockets, each containing an individual record in vertical upstanding position arranged fan-like relative to the axis of rotation of the magazine, together with a vertically disposed turntable positioned centrally above the magazine in axial relation thereto. By means of the structure disclosed in said application, a selected record could be rolled up and presented to the turntable from either diametric side of the magazine. By means of diametrically opposed record shift arms, and the selective operation of one or the other said arms, a selected record could be shifted with a selected side thereof presented in playing position on the turntable. Thus, if a selected record is shifted from one side of the magazine one side will be reproduced, and if shifted from the opposite side of the magazine, the other side of the record will be reproduced. Thus the rotative position of the magazine will present a selected record for reproduction, and depending upon the selection of the shifting arm, a selected side of said selected record may be presented for reproduction.

In the record changer of the above said application, the magazine was designed to receive on the order of fifty-two records to reproduce one hundred and four selections. It is the purpose of this invention to so modify the record magazine and the cooperating shifting arms whereby as many as one hundred records may be similarly carried in the magazine and manipulated to play two hundred selections without increasing the diameter or circumference thereof.

The above modification to accommodate as many as one hundred records in the same size magazine is accomplished by providing the magazine with a series of alternately arranged major and minor separator plates radially extending and spaced to provide a pocket for reception of each record. Every other plate which may be herein termed a major plate extends from an outer retaining ring notched centrally of each pocket to be engaged by the outer edge of the record which extends, inwardly to an inner core. Every other and intermediate minor plate extends from said ring to terminate short of and substantially spaced from the inner core. By this arrangement, two records (in place of one) may be positioned between adjacent major plates with their inner edges lying face to face and in abutment with the inner core, but with the outer portions of said records being separated by the minor plates.

In this manner, twice as many records may be spaced about the inner core as in the magazine of the above said application by reason of the inner edges of each pair of records lying face to face instead of being separated. While no problem is involved in accommodating twice as many records in the same dimensioned magazine at their outer edges, the problem here overcome lays in accommodating twice as many records at the inner core and still provide an individual pocket for each record.

Another feature of the invention resides in the means for accurately engaging the outer edge of a selected record by the shift arms while permitting said arms to pass through the reduced space between the separator plates to shift the record from the magazine to the turntable, and particularly wherein said record may be warped. This is accomplished by providing the record engaging end of each shift arm with a claw-like end including a pair of outwardly biased lips, and means to compress the lips to enter them into the pocket while permitting them to spread and yieldingly engage the inner surfaces of the separator plates whereby the edge of the record will be engaged even though it may be warped. This arrangement permits the lips of said claws to automatically spread outwardly upon presenting the record to the turntable and allow ample clearance for the rotation of a warped record during reproduction.

A further feature of the invention lies in the means for adjustably stabilizing said arms when in raised position so as to center the opened lips of the claw with the rotating record when in playing position to avoid record engagement therewith by reason of lateral tilting or shifting of said arm. This is accomplished by providing the lower end of each arm with a camming enlargement for engagement between a pair of adjustable stabilizer rollers when the arm is in its uppermost position during record reproduction.

A further feature of this invention resides in the provision of a selector scanning arm release arranged to be operated during the manual reloading of records in the magazine. In the above said application, when reloading the magazine, it could be rotated manually through the camming release of a drive arm by which the magazine was driven. In the present invention, the drive arm may be eliminated, the magazine being directly connected to the drive shaft and selector scanning arm. Means is therein provided for manually shifting the scanning arm out of positon to be arrested by a projected selector pin. Thus, through manual operation of a lever, the scanning arm may rotate with the magazine during record loading free of interception by a projected selector pin. This is effected by pivotally mounting the scanning arm intermediate its ends upon its driving arm spring biased out of selector pin engaging position. Through a manually operated lever, the pin engaging end of the scanning arm may be swung about its pivotal mounting into or out of pin engaging position. This arrangement will permit free, uninterrupted rotation of said arm with the manual rotation of the magazine when the lever is in one position, and render said arm effective to selectively position the magazine upon said lever being moved to another position.

The full nature of the invention will be understood from the accompanying drawings and the following description and claims:

Application Serial No. 388,242, filed October 26, 1953, entitled "Automatic Phonograph" is made a part hereof by reference, wherein the mechanism for selectively positioning the horizontally rotatable magazine, shifting a selected record from a selected side thereof into playing position on the turntable and reproducing said record and including the control circuit therefor, is in all material respects employed in like manner herein, the operative elements in this application being identified by the same reference numbers as those used to identify said parts of the above application.

Figure 1:
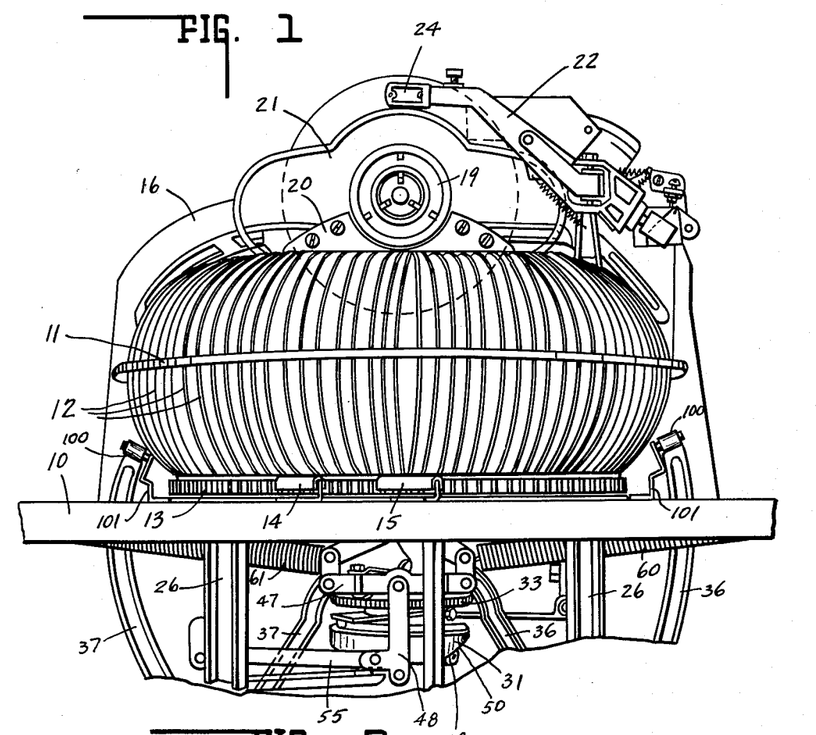
FIG. 1 is the front elevation of the record changer showing it in rest position and with a series of records positioned in the magazine.

In the drawings, and referring to FIG. 1, there is shown a record changing mechanism supported upon a base plate 10. Mounted for rotation about a vertical axis there is provided a magazine 11 having a series of (100) radially-disposed record receiving pockets in which the individual records 12 are carried on edge to extend radially of the axial center of rotation of the magazine.

Supporting the magazine and rotatable therewith there is an indexing plate 13 having a series of ratchet teeth thereabout, one for each pocket and record. Carried by a base plate 10, there is a pair of spring pawls 14, 15 riding into engagement with the teeth of the indexing plate for restraining it against rotation in a direction reverse to that of the direction of rotation for record selection. For reasons hereinafter more particularly set forth, said spring pawls are so relatively spaced as to alternately interlock with the teeth of the indexing plate.

Supported above the base plate 10, there is a frame 16 upon which there is mounted a turntable 19, record tracking frame 20 and record guide plate 21. Said frame 16 also mounts a tone arm 22 carrying a reproducer 24 for reproduction of one or the other side of the record. Suitably suspended below the base plate 10, there is provided a selector drum 29 including a series of solenoid actuated selector pins 112. Also mounted below the base plate, there is rotatably mounted a main cam 31 operative in the manner hereinafter described for controlling the shifting of the records from the magazine to the turntable, the centering and clamping thereof, and the tone arm controls, all as more particularly disclosed in the above application.

There is provided a main drive shaft 32 keyed to the magazine for effecting rotation thereof. Said shaft 32 is selectively driven in one direction only by the driving gear 33 through the pinion 34 by a reversible record selecting and changing motor 35. Through suitable clutch means, as more particularly shown in said application, said motor when operating in one direction rotates the drive shaft and magazine in a clockwise direction when looking down thereon, until it is arrested by one of the selector pins of the selector 29. Thereupon, a reversing switch is actuated to reverse the direction of the motor 35 which, through the clutch means, allows the magazine to remain in its arrested position and drives the main cam 31 in the opposite direction to shift the record.

For shifting the record from the magazine to the turntable, there is provided a pair of opposed arcuate shift arms 36, 37, each carried by a bearing arm 38, 39 respectively. Said bearing arms have their inner operating ends pivotally supported on the underside of the base plate to permit independent record shifting movement. Upon the magazine being positioned to present a selected record to one of the arms, the opposite arm will be restrained from operation by the magazine so that only the selected arm may then roll a record into position to be secured to the turntable 19 for reproduction of one or the other side, depending upon the arm selected. Thus, with a single tone arm and reproducer, a record will be reproduced on one side if positioned by the rotating magazine in the plane of the turntable for shifting by one of said arms, and on the other side thereof, if positioned by the magazine in the plane of the turntable for shifting by the opposite said arm. The selection of the side of the record to be reproduced is, therefore, determined by the positioning of the record for shifting to the turntable from one or the other side thereof.

*Record shifting mechanism (see FIG. 2)*

Figure 2:
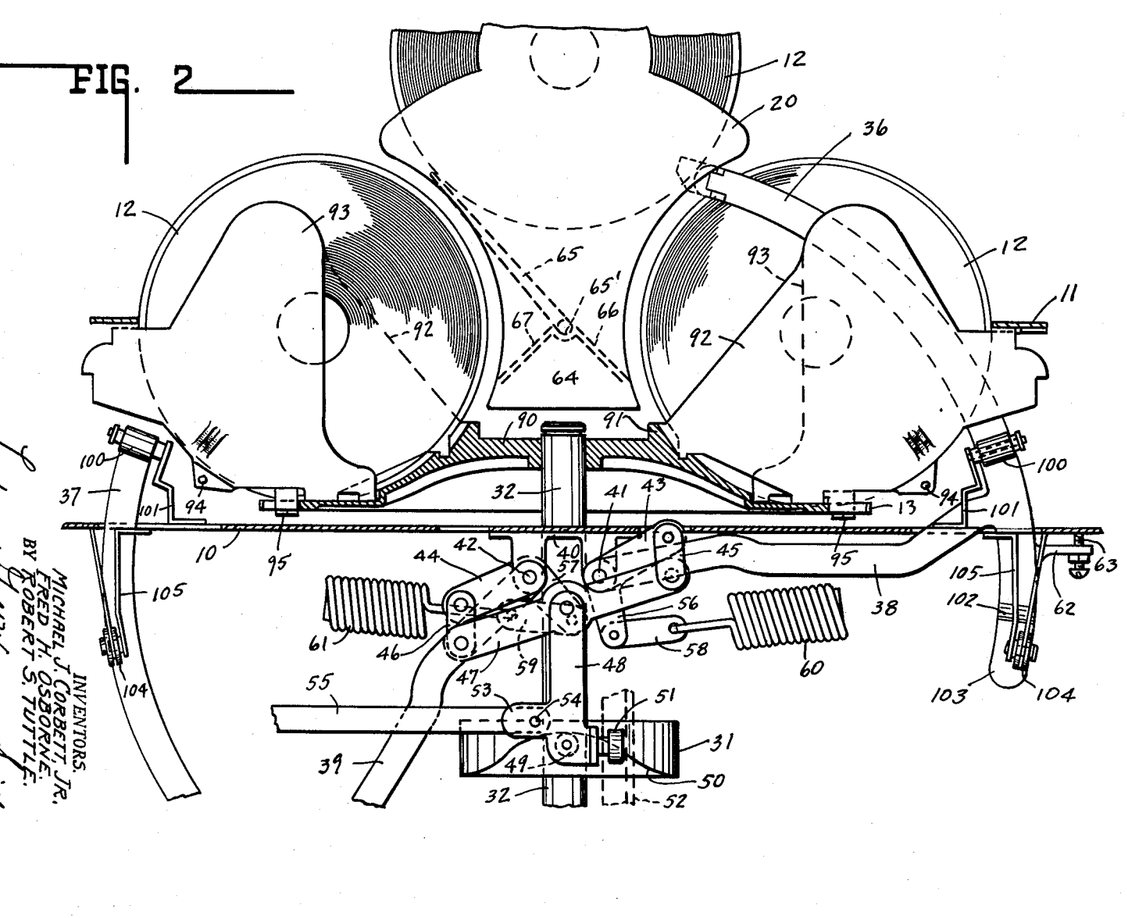
FIG. 2 is a front elevation of the record shifting mechanism showing the record shifted from one side of the magazine to the turntable for reproduction of a selected side, with parts removed for clearness.

The base plate 10 carries a bearing bracket 40 in which there is mounted a pair of spaced shafts 41 and 42. Secured to said shafts, there is a pair of arms 43 and 44, respectively. The free end of the arm 43 is pivotally connected to a link 45 and similarly the free end of the arm 44 is pivotally connected to a link 46. Said links 45 and 46 at their opposite ends are each pivotally connected to an equalizing bar 47. Said bar in turn is pivoted intermediate its ends to an arm 48 depending from the equalizing bar and carrying on its opposite end a cam follower 49. Said cam follower is positioned to track a cam profile 50 of the main cam 31. The lower end of said cam arm 48 also carries a stabilizing roller 51 riding on a vertical track 52 secured to the frame. In addition thereto, said arm is provided with an ear 53 pivotally connected at 54 with a stabilizing strap 55 pivoted at its opposite end to one of the brackets 26. Also, secured to the respective shafts 41, 42 are angularly disposed arms 56, 57, respectively, their free ends being pivotally connected to the links 58, 59, respectively. Connected to the free ends of said links, there are provided tension load springs 60, 61, respectively. The opposite ends of said springs are fixedly secured to the base plate 10. Also secured to said shafts 41, 42 are the lifting arms 38, 39, respectively, rigid with the arcuate shift arms 36, 37.

In respect to the operation of the shift arms, it is to be noted that they are slightly out of line with each other in that while their lifting arms 38, 39 extend in opposite directions, they are slightly offset so as to lie in different vertical planes to the extent of one half the angular displacement between the record receiving pockets of the magazine. Accordingly, when the magazine is arrested with a pocket and record aligned with the shift arm 36, the shift arm 37 will lie in a plane slightly to one side thereof out of record alignment. Similarly, when the shift arm 37 is aligned with the record, the arm 36 will be out of record alignment. With this arrangement when the magazine is positioned to present a record to arm 36, it may freely move through the magazine pocket to shift the record into position for centering on the turntable. But the arm 37 will be restrained from movement through engagement with the magazine since it cannot enter a pocket. For this reason, the differential linkage above described is provided.

When the cam profile forces the cam follower 49 and arm 48 downwardly to its lowermost position against the tension springs 60, 61, the shafts 41, 42 will be rotated by the equalizing bar 47 and connecting linkage to lower both arms 36, 37 free of the magazine to permit its rotation to a selected position as the cam 31 revolves to permit the cam follower 49 to ride upwardly on the profile 50 under tension of said springs. The equalizing bar 47 will normally permit both shift arms to move upwardly. However, due to the offset relation of said arms, only one of them will have been aligned with the record, such as arm 36. Arm 37 will be restrained from upward movement through engagement of its free end with the magazine intermediate the records. This will cause the equalizing bar to tilt as it is moved upwardly, shaft 42 being restrained from rotation by arm 37 while shaft 41 will be permitted maximum rotation under tension spring 60 to swing the shift arm 36 upwardly through the aligned slot in the plate 10 and magazine to the position shown at the right hand side of FIG. 2, pushing the record 12 contained therein with it into position to be centered on the turntable. After limiting its upward movement and adjusting the extent thereof to accurately position the record for centering on the turntable, the arm 36 as well as the arm 37, is provided with a protruding bracket extension 62 carrying an adjustable stop screw 63 positioned to engage the underside of the base plate 10.

Upon the magazine being indexed to record selecting position to register a record with the shift arm 36, one of the spring pawls 14, 15 drops into latching position with one of the ratchet teeth on the indexing plate 13. The magazine is thus restrained from reverse movement. The other spring pawl, however, is located midway of a ratchet tooth communicated in latching position only when the magazine is positioned for registering a record with the shift arm 37 on the opposite side. Since the shift arms 36 and 37 are slightly offset relative to each other, one spring pawl locks in when one of said arms is aligned with a record while the other locks in when the opposing arm is in record alignment.

*Record positioning on turntable (see FIGS 1 and 2)*

Disposed centrally of the annular rotatable magazine there is provided a bearing plate 64. Said plate carries the record guide frame 20 and is normally biased in alignment with the plane of the turntable. The frame 20 pivotally mounts the record tracking arm 65 at 65'. Said tracking arm is swung from one side to the other by the record 12 as it is pushed upwardly from the magazine by one or other shift arms 36, 37. It is thus swung into alignment with one or the other sloping tracks 66, 67 formed in the frame 20 and up which the record is rolled into centering position relative to the turntable. Upon the magazine being indexed to record selecting position to register a record with the shift arm 36, one of the spring pawls 14, 15 drops into latching position with one of the ratchet teeth on the indexing plate 13. The magazine is thus restrained from reverse movement as well as being accurately positioned. However, reverse movement may be permitted by de-clutching its driving clutch spring hereinafter described.

The other spring pawl, however, is located midway of a ratchet tooth and engaged in latching position only when the magazine is positioned for registering a record of the other shift arm 37 on the opposite side. Since the shift arms 36, 37 are slightly offset relative to each other, one spring pawl locks in when one of said arms is aligned with the record, while the other locks in when the opposing arm is in record alignment.

*Magazine separator plates (see FIGS. 2 and 3)*

Figure 3:
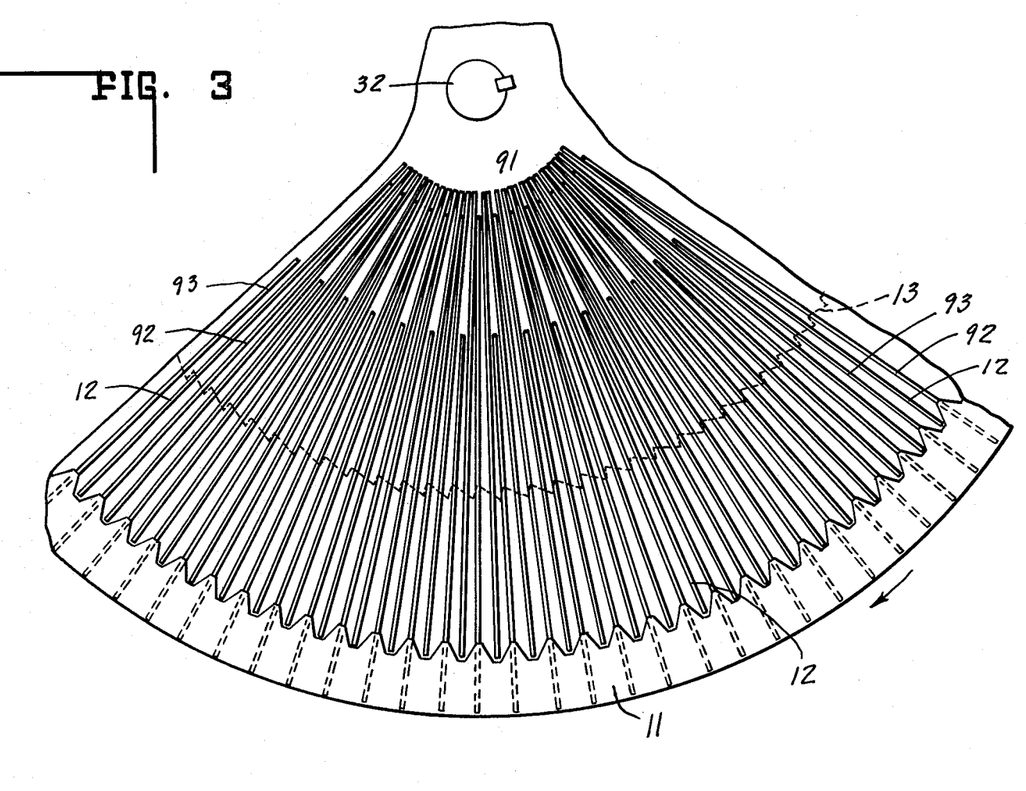
FIG. 3 is an enlarged plan view of the magazine showing the relation of the records and separator plates.

In the magazine of this invention the shaft 32 is keyed to the supporting plate 90 formed with a central annular core 91 against which the inner edge of the radially-disposed records abut. Mounted on said supporting plate, there are a series of separator plates arranged in radially-extending spaced relation. Every other said plate may be termed a major separator plate 92, the intermediate plates being herein referred to as minor separating plates 93. The space between adjacent major and minor plates provides a pocket for reception of a record 12. each embracing one of the notches in the outer ring 11. The major plates extend into the periphery of the core 91 whereas the minor plates terminate short of the core. Each pair of major and minor plates are secured to each other in spaced relation and to the base of the supporting plate 90 as indicated at 94 and 95, respectively. This arrangement of the separator plates is such that there will be provided two record receiving pockets between each pair of major plates to receive a pair of records separated by the minor plate 93, but by reason of it terminating short of the core, the inner edges of said pair of records will lie in face to face engagement at the point of their core abutment. By reason of this construction and arrangement of the separator plates and pocket formation, the peripheral space to receive the inner edges of the records will be modified to accommodate as many as one hundred records as distinguished from normally accommodating approximately half that many.

*Record shifting arms (see FIGS. 5–8)*

Due to the increase in the number of records and the corresponding decrease in the width of the pockets between the separator plates, the nose of each shift arm 36, 37 is provided with a record engaging claw 95. Said claw comprises a pair of opposed lips 96 pivotally mounted on each shift arm at 97 and biased outwardly by a wire spring 98 carried by the pin 99.

Each of said shift arms operate between a pair of rollers 100 rotatably mounted on the bracket 101 carried by the base plate 10. This arrangement is such that as the claw enters the pocket between plates 92, 93, the rollers 100 will have pinched the fingers 96 inwardly against the tension of spring 98 until they clear the outer edge of the plates 92, 93. The biasing of the fingers outwardly will then cause them to move into scraping engagement of the inner surface of the plates so as to pick up the edge of the record in the pocket irrespective of its possible warped condition, as indicated by dotted lines in FIG. 5. The record will thus be engaged and shifted to the turntable as shown in FIG. 2, whereupon the fingers will disengage the upper forward edges of the plates to spread out clear of the record to permit rotation thereof by the turntable when in playing position. The outward spreading of the claw fingers in this position is important to allow sufficient play for a warped record. When the shift arm is withdrawn with the record upon completion of its reproduction, the fingers will be pinched inwardly as they cam into the pocket between the plates to thereby guide a record, irrespective of its possible warped condition, into the pocket for lowering into the magazine.

Figure 9:
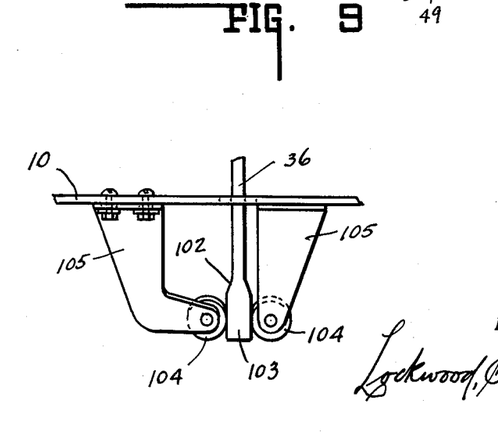
FIG. 9 is a front elevation of the record shift arm when in its uppermost stabilized record reproducing position.

As shown in FIG. 9, the lower portion of each shift arm below its junction with its bearing arm 38, 39 is formed with a camming shoulder 102 leading to a stabilizing head 103. When the shift arm is moved to its uppermost position during play of the record shifted thereby, the head 103 will move into position between a pair of stabilizing rollers 104 as they ride over the camming shoulder 102. Said rollers are mounted on brackets 105 adjustably supported below the base plate 10. A function of the stabilizing rollers is to stabilize the record engaging end of the shift arm during record reproduction to prevent wobble or shift thereof such as would cause a record or possibly a warped record to engage one of the fingers 96. Thus it is desirable to adjust the brackets 105 to cause the stabilizing rollers 104 to center the claw relative to the record rotating on the turntable and maintain it in such centered position.

*Selector mechanism (see FIG. 4)*

The magazine drive shaft 32 is driven so that the magazine is rotated clockwise in the direction of the arrow (FIG. 3) about the motor 35. The driving connection between the gear 33 and the shaft 32 comprises a clutch spring 95 surrounding said shaft. Thus, upon the gear being driven in said clockwise direction, the clutch spring 95 will wind up and rotate the shaft herewith, but upon the gear being driven in a reverse direction upon reversal of the motor 35, the shaft will become de-clutched.

Figure 4:
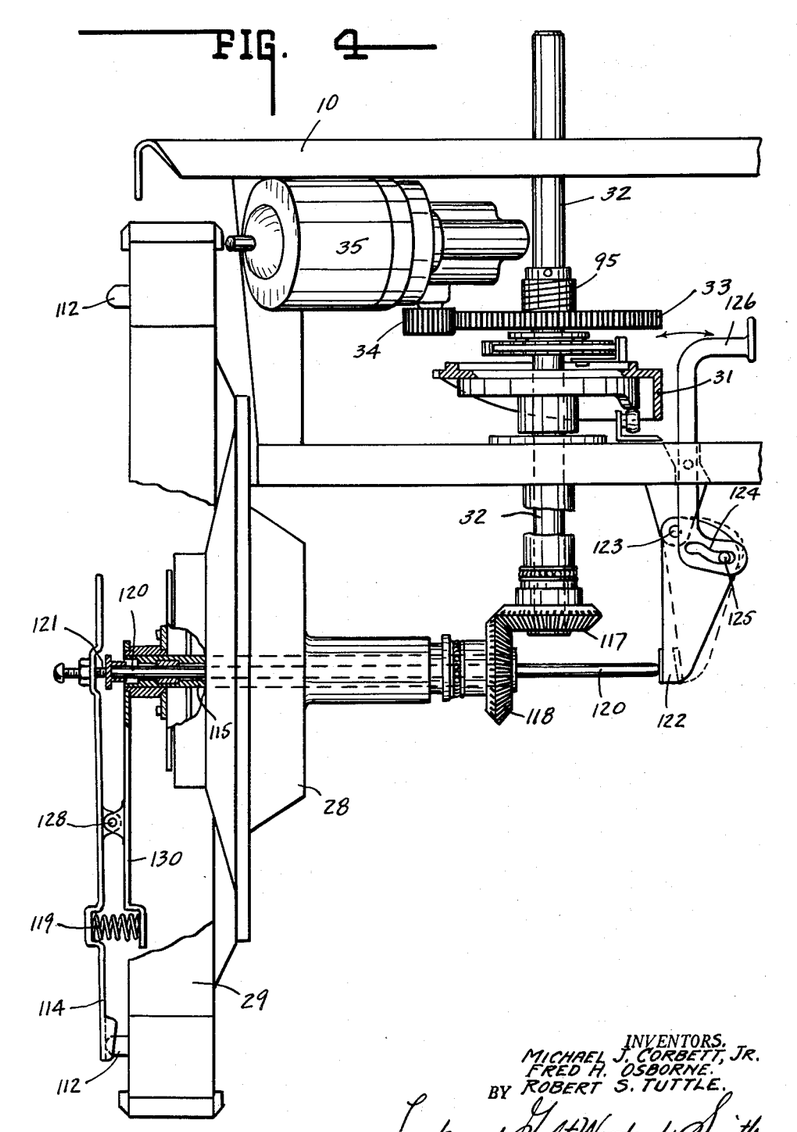
FIG. 4 is a schematic illustration of a magazine drive interconnected with the selector scanning arm.
Figure 5:
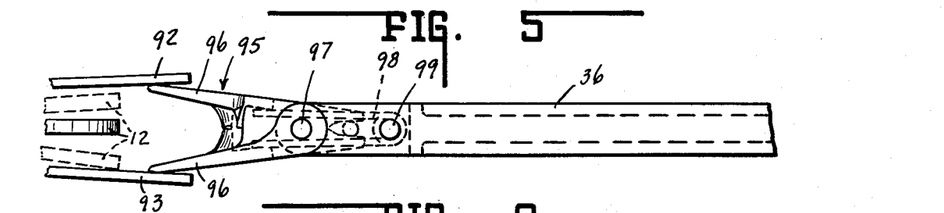
FIG. 5 is a plan view of the record shift arm with the record engaging claw entering the record receiving pocket for record engagement, the outer edge of the record being shown in full lines and a warped record indicated by dotted lines.
Figure 6:
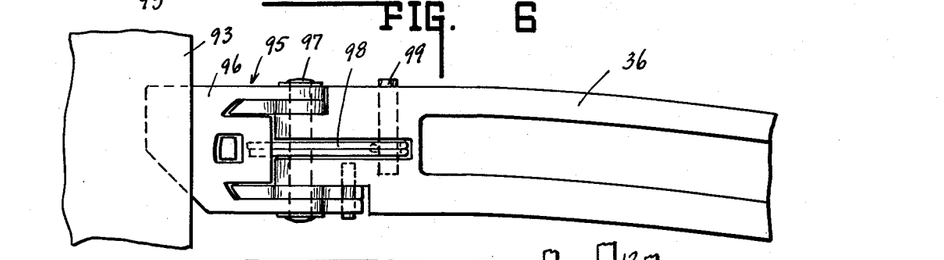
FIG. 6 is the same as FIG. 5 showing a side elevation thereof.
Figures 7, 8:
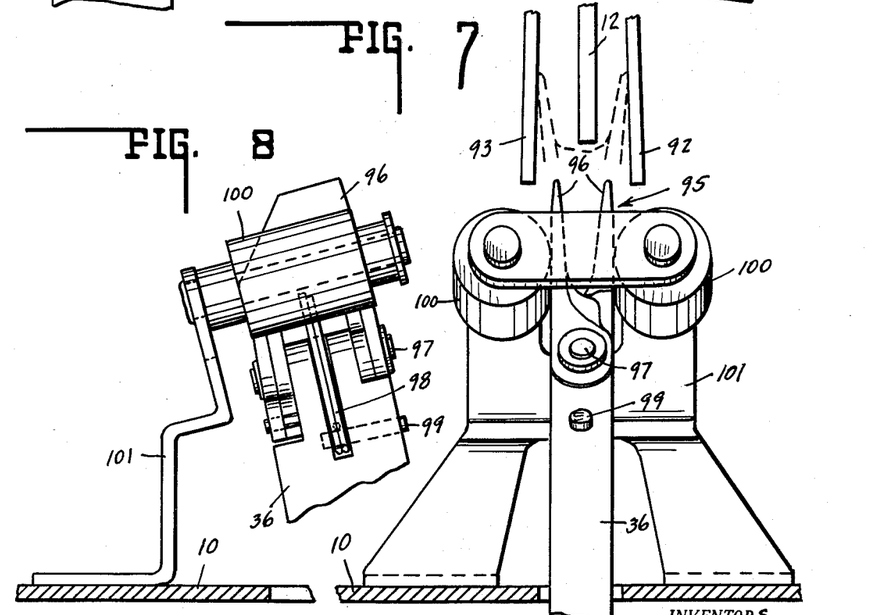
FIG. 7 is a front elevation with the record engaging claw compressed in its lower position for entry into the record pocket.
FIG. 8 is the same as FIG. 7 showing a side elevation thereof.

Upon the motor being reversed to drive the gear 33 counterclockwise, the record shifting cam 31 will be rotated to actuate the record shift arms 36, 37. Thus upon said gear being driven in one direction, the magazine is rotated with the cam standing idle, and when driven in the opposite direction, the cam is rotated while the magazine remains idle. All, as more particularly set forth in said above mentioned application.

The selector drum 29 is in all respects similar to and operated in a manner heretofore set forth and described in Letters Patent 2,631,856 (FIG. 10), granted March 17, 1953, for Automatic Phonograph. In said drum, each selector pin is released to be projected outwardly upon an associated solenoid (not shown) being energized through a remote control selector. Upon said pin 112 being projected outwardly, it extends into the path of rotation of the scanning arm 114 driven by a hollow drive-shaft 115 from the hollow drive-shaft 32 through the medium of the beveled gears 117, 118. Thus the magazine and the scanning arm rotate together and when a projected pin 112 is engaged by the scanning arm, it will arrest the rotation of the shaft 32 and magazine at the selected position, the over-riding or free-wheeling being provided by the clutch 95. For this purpose, the scanning arm is driven by and rotates with the driving arm 130 to which it is pivotally mounted or fulcrumed at 128. The scanning arm is biased outwardly to ride over and free of any projected selector pins 112 by a spring 119, but is normally held against the tension of said spring into pin engaging position by a control rod 120. Said rod extends through the drive shaft 115 and is axially slidable therethrough into abutting engagement with the free end of the scanning arm as indicated at 121. Thus when the arm is shifted to the left (FIG. 4) it is in its normal position operating against spring 119 to hold the scanning arm in pin engaging position. When said rod is released, spring 119 forces the scanning arm out of pin engaging position which in turn shifts said rod to the right.

Said rod is manipulated by a lever 122 which is fulcrumed on the frame of the machine at 123. Associated with said lever, there is a sinuous cam track 124 in which a camming pin 125 rides. When the pin is in the lowered right-hand side of the camming track, the lever is locked against the rod 120 to hold the scanning arm in position for pin engagement. When the lever is swung upon its pivot the pin is cammed upwardly by the opposite portion of the camming track, permitting rod 120 to release the scanning arm so that spring 119 may swing its actuating end outwardly sufficiently far to clear any projected selector pins.

The lever 122 is associated with the fulcrumed manually operated lever 126 provided with a suitable handle to be manipulated back and forth in the direction of the arrow. The lower end of said lever 126 carries the cam groove 124 which embraces the pin 125. This cam groove is so arranged that when it is in the position shown, it locks pin 125 and lever 122 to hold the scanning arm 114 in its effective position for automatic record selection. When it is desired to reload the magazine, the lever 126 is manually moved to the opposite direction, bringing the raised portion of the cam groove 124 into engagement with the pin 125, raising said pin to swing the lever 122 about its pivot 123 to the position shown in dotted lines to release pressure on the rod 120 and permit spring 119 to move the scanning arm out from the selector pin engaging position.

The automatic control of the selector pins and reversible motor is as described in the above identified application and particularly illustrated in FIGS. 10, 10-B and 14 thereof, there being provided motor reversing switches and controls therefor respectively governed by selector pin arresting of the scanning arm and the lower cam track of cam 31, said switches and the control thereof being embraced within the housing 28. This arrangement is such that upon the scanning arm being arrested in its rotation by a projected selector pin, the driving tongue applied to shaft 32 will actuate a reversing switch to reverse the motor. Thereupon shaft 32 will be de-clutched by the clutch 95 and the cam 31 driven. This will bring the magazine to rest at its selected position and cause the record shift levers to be operated to shift a record into playing position on the turntable. Upon completion of the playing of the record, the reversing switch will be actuated to rotate the motor 35 in the opposite direction which will cause the shaft 32 to be again clutched, and the cam 31 released, to rotate the magazine and scanning arm to bring a new selected record into position.

Upon the record being shifted from the magazine to the turntable, it will be clamped thereto for rotation in the vertical plane in the manner more particularly shown and described in FIGS. 8 and 9 of said application, a feature to which this invention is not directed. In such clamped position on the turntable, it will be engaged for reproduction by the reproducer 24 carried by the tone arm 22 manipulated in the manner more particularly set forth in FIGS. 15 and 16 of said application.

From the foregoing it will be observed that the record changer of this invention will handle as many as one hundred records in a relatively small space as compared with other changers handling a like number of records, and in fact a space no larger than a changer handling half as many records, irrespective of whether or not the records are badly warped.

The invention claimed is:

1. In an automatic record changing device for phonographs, a horizontally rotatable magazine for receiving a plurality of radially disposed vertically positioned records, driving means for rotating said magazine, said magazine including a central core portion and a peripheral ring portion, a series of annularly spaced major separator plates extending from adjacent said ring portion radially inward to adjacent said core portion to provide a pocket for receiving a pair of records, a minor separator plate intermediate each adjacent pair of major plates extending radially inward from adjacent said ring portion short of and spaced outwardly from said core portion to provide an individual pocket for each record by separating the outer portions while permitting face-to-face engagement of the inner edge portions thereof, a record shift arm, means operable to move said shift arm into and out of one of said individual pockets to engage the outer edge of the record therein and carry it to and from playing position, an outwardly biased collapsible claw on the record engaging end of said arm, said claw including fingers engaging the pocket plates upon entering between adjacent plates and passing through said pocket in record engagement and spreading outwardly to clear the edge of said record when in playing position, a scanning arm operably connected to a said driving means to rotate with said magazine, an annular selector drum having a series of selector pins movable into the paths of said arm to arrest the movement of said arm and magazine to present a selected pocket and record therein to said shift arm, and manually operable means movable to shift said scanning arm out of said pin engaging paths to permit said magazine and arm to be freely moved during reloading of records in said magazine pockets.

2. In an automatic record changing device for phonographs, a horizontally rotatable magazine for receiving a plurality of radially disposed vertically positioned records, said magazine including an annular series of radially disposed pockets, each pocket being defined by alternate vertically disposed major and minor separator plates between which a said record is adapted to be received, said minor plates having their inner ends terminating short of the inner ends of said major plates sufficiently to permit the inner edge portions of pairs of records to lie in face-to-face engagement, a record shift arm having an outwardly biased collapsible claw on the record engaging end thereof, said claw including fingers engaging the pocket plates upon entering between adjacent plates and passing through said pocket in record engagement and spreading outwardly to clear the edge of said record when in playing position, driving means for alternately rotating said magazine and actuating said shift arm, a scanning arm operatively connected with said driving means to rotate with said magazine, an annular selector drum having a series of selector pins movable into the path of said arm to arrest the movement of said arm and magazine to present a selected record to said shift arm, the torque imposed upon said driving means upon said scanning arm being arrested being effective to actuate said shift arm, and manually operable means movable to shift said scanning arm out of said pin engaging path to permit said magazine to be freely moved therewith during record reloading of said pockets.

3. In an automatic record changing device for phonographs, a horizontally rotatable magazine for receiving a plurality of radially disposed vertically positioned records, of predetermined diameter said magazine including a central core portion and a peripheral ring portion, a series of annularly spaced major separator plates extending from adjacent said ring portion radially inward a distance substantially coextensive with said record of predetermined diameter to adjacent said core portion to provide a pocket for receiving a pair of records, and a minor separator plate intermediate each adjacent pair of major plates extending radially inwardly from said ring portion a distance substantially less than that of the major separation plates and terminating short of said core portion to provide an individual pocket for each record by separating the outer portions while permitting face-to-face engagement of the inner edge portions thereof, each record at the inner portion thereof radially of said magazine being supported and guided by one major separation plate and an adjacent record.

4. In an automatic record changing device for phonographs, a horizontally rotatable magazine for receiving a plurality of radially disposed vertically positioned records of predetermined diameter, said magazine including a series of annularly spaced major separator plates extending in vertical planes from the periphery of said magazine radially inwardly a distance substantially coextensive with said record of predetermined diameter to the central portion thereof, to provide a pocket for receiving a pair of records, and a minor separator plate intermediate each adjacent pair of major plates extending in a vertical plane with at least its inner end spaced a substantial distance short of the inner ends of said major plates radially of said magazine to separate records in each said pocket while permitting face-to-face engagement of their inner edge portions, each record at the inner portion thereof radially of said magazine being supported and guided by one major separation plate and an adjacent record.

5. In an automatic record changing device for phonographs, a horizontally disposed magazine including a series of pockets, each pocket being defined by a pair of vertically disposed separatior plates between which a record is adapted to be received, a record shift arm, means operable to move said shift arm into and out of a selected pocket to engage the outer edge of the record therein and carry it to and from playing position, and an outwardly biased collapsible claw on the record engaging end of said arm, said claw including fingers engaging the pocket plates upon entering between adjacent plates and passing through said pocket in record engagement and spreading outwardly to clear the edge of said record when in playing position.

6. In an automatic record changing device for phonographs, a horizontally disposed magazine including a series of pockets, each pocket being defined by a pair of vertically disposed separatior plates between which a record is adapted to be received, a record shift arm, means operable to move said shift arm into and out of a selected pocket to engage the outer edge of the record therein and carry it to and from playing position, an outwardly biased collapsible claw on the record engaging end of said arm adapted to be collapsed, said claw including a pair of lips adapted to embrace the edge of said record, and a pair of spaced members positioned in the path of movement of said shift arm adjacent its point of entry into said pocket, said spaced members engaging said lips to effect the collapse thereof upon said claw entering said pocket, the lips of said claw spreading apart after entering and bearing against the inner faces of said plates for record engagement, said claw passing through said pocket, the lips of said claw spreading apart upon passing out of engagement with said inner faces of said plates.

7. In an automatic record changing device for phonographs, a horizontally disposed magazine including a series of pockets, each pocket being defined by a pair of vertically disposed separator plates between which a record is adapted to be received, a record shift arm, means operable to move said shift arm into and out of a selected pocket to engage the outer edge of the record therein and carry it to and from playing position, an outwardly biased collapsible claw on the record engaging end of said arm adapted to be collapsed said claw comprising a pair of fingers biased apart, and means positioned in the path of movement of said shift arm for engaging and collapsing the fingers of said claw upon entering said pocket, said fingers thereafter being biased outwardly into sliding engagement with the inner surfaces of said plates for picking up the record therebetween, said claw passing beyond said plates and the fingers thereof biasing outwardly to clear the edge of a record in playing position, said claw biasing outwardly upon leaving said pocket during record play and being cammed to collapsed position by said plates upon re-entering said pocket to guide the record into said pocket while carrying it from playing position.

8. In an automatic record changing device for phonographs, a horizontally movable magazine for receiving a plurality of vertically positioned records, said magazine including a series of pockets each defined by a pair of vertically disposed separator plates between which a record is adapted to be received, a record shift arm, means mounting said arm for pivoting about a center remote from said arm, means operable pivotably to move said shift arm about said center into and out of a selected pocket to engage the outer edge of the record therein and carry it to and from record playing position, a bifurcated nose on one end of said shift arm for embracing the edge of the record in spaced relation thereto while the record is in playing position and for receiving and guiding said record into its pocket upon movement of the record from record playing position to said magazine, means remote from said record playing position engaging said arm at a first point adjacent said magazine for accurately positioning said bifurcated end to engage a record in the magazine, and means more remote from said magazine operable upon movement of said arm to record playing position for engaging said arm and effective with the first point of engagement for centering and stabilizing said bifurcated end relative to the edge of the record while the record is in playing position to provide clearance therefor.

9. In an automatic record changing device for phonographs as claimed in claim 8, wherein the means more remote from the magazine for engaging the arm comprises an enlargement on the adjacent end of the arm having a pair of camming shoulders, and a pair of stabilizing rollers gripping said enlargement when the arm is moved to record playing position to thereby prevent shift or wobble of said arm at its bifurcated end and center said end relative to said record.

(References on following page)

References Cited in the file of this patent

UNITED STATES PATENTS

| | | |
|---|---|---|
| 1,377,027 | Pettit | May 3, 1921 |
| 1,970,417 | Dahlstrom | Aug. 14, 1934 |
| 2,281,548 | Andrews | May 5, 1942 |
| 2,610,858 | Kenney | Sept. 16, 1952 |
| 2,616,706 | Maurer | Nov. 4, 1952 |
| 2,796,263 | Moore | June 18, 1957 |
| 2,804,307 | Rockola | Aug. 27, 1957 |

FOREIGN PATENTS

| | | |
|---|---|---|
| 512,288 | Italy | Jan. 29, 1955 |
| 731,730 | France | Sept. 6, 1932 |